United States Patent [19]

Carletti et al.

[11] Patent Number: 5,083,900
[45] Date of Patent: Jan. 28, 1992

[54] TURBOMACHINE STATOR ELEMENT

[75] Inventors: Ollivier Carletti, Vaux Le Penil; Michel, E. A. J. Thomas, Saintry Sur Seine, both of France

[73] Assignee: Societe Nationale d'Etude et de Construction de Moteurs d'Aviation "S.N.E.C.M.A.", Paris, France

[21] Appl. No.: 607,696

[22] Filed: Nov. 1, 1990

[30] Foreign Application Priority Data

Nov. 15, 1989 [FR] France .................. 89 14963

[51] Int. Cl.⁵ ............................................ F04D 29/54
[52] U.S. Cl. .................... 415/209.3; 415/191
[58] Field of Search .......... 415/208.1, 209.2, 209.3, 415/209.4, 210.1, 191

[56] References Cited

U.S. PATENT DOCUMENTS

| | | | |
|---|---|---|---|
| 2,857,093 | 10/1958 | Warnken | 415/209.3 |
| 2,914,300 | 11/1959 | Sayre | 415/135 |
| 3,291,382 | 12/1966 | Blackhurst et al. | 415/208.2 |
| 3,339,833 | 9/1967 | Bill et al. | 415/210.1 |
| 3,442,442 | 5/1969 | Seiwert | 415/200 |
| 3,708,242 | 1/1973 | Bruneau et al. | 415/209.4 |
| 3,778,185 | 12/1973 | Plowman et al. | 415/209.4 |
| 4,378,961 | 4/1983 | Trousdell | 415/137 |
| 4,594,761 | 6/1986 | Murphy et al. | 415/208.1 |
| 4,940,386 | 7/1990 | Feuvrier et al. | 415/209.3 |

FOREIGN PATENT DOCUMENTS

| | | |
|---|---|---|
| 1021265 | 11/1952 | France . |
| 2568953 | 2/1986 | France . |
| 2599081 | 11/1987 | France . |
| 722458 | 1/1955 | United Kingdom . |

Primary Examiner—John T. Kwon
Attorney, Agent, or Firm—Oblon, Spivak, McClelland, Maier & Neustadt

[57] ABSTRACT

A turbo-machine stator element comprising an array of fixed blades mounted on a ring has the head of each blade embedded in an aperture in the ring by fixing member comprising first and second interfitting members each consisting of a plate portion and an integral socket portion. The socket of one of the members fits into the aperture, and the socket of the other member fits into the socket of the first member and houses the head of the blade. The plate portions of the two members sandwich the ring around the aperture.

12 Claims, 2 Drawing Sheets

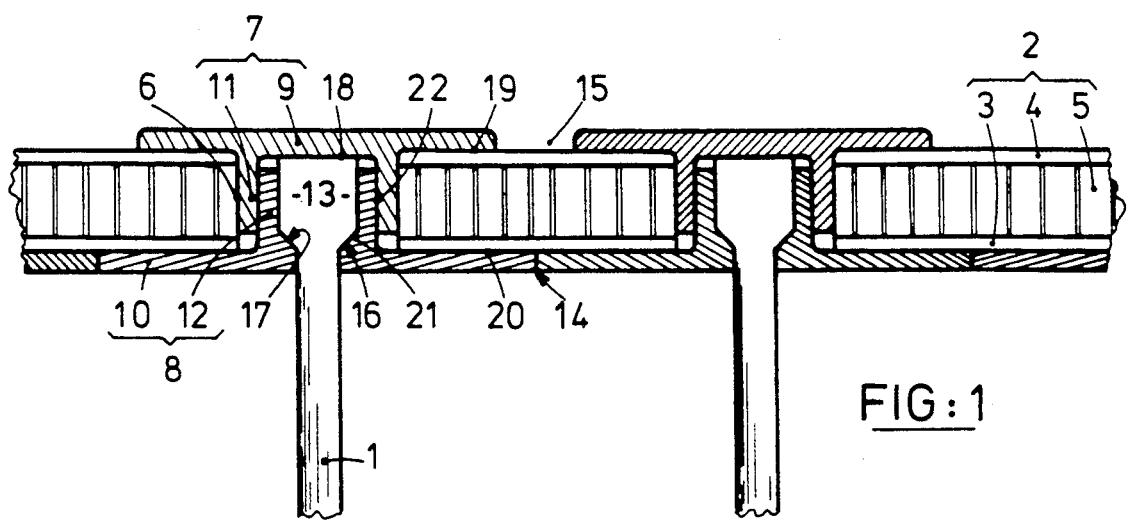
FIG:1
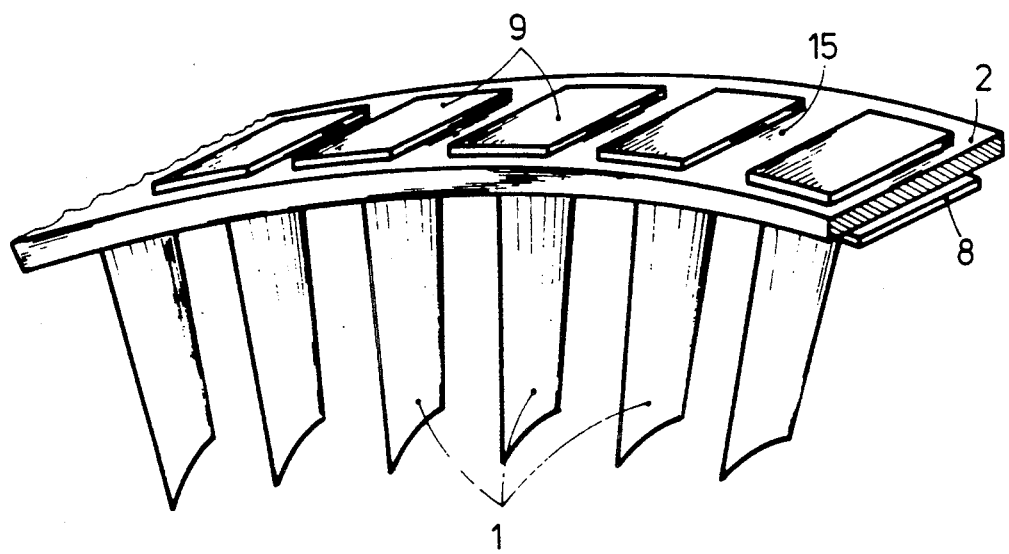
FIG:2

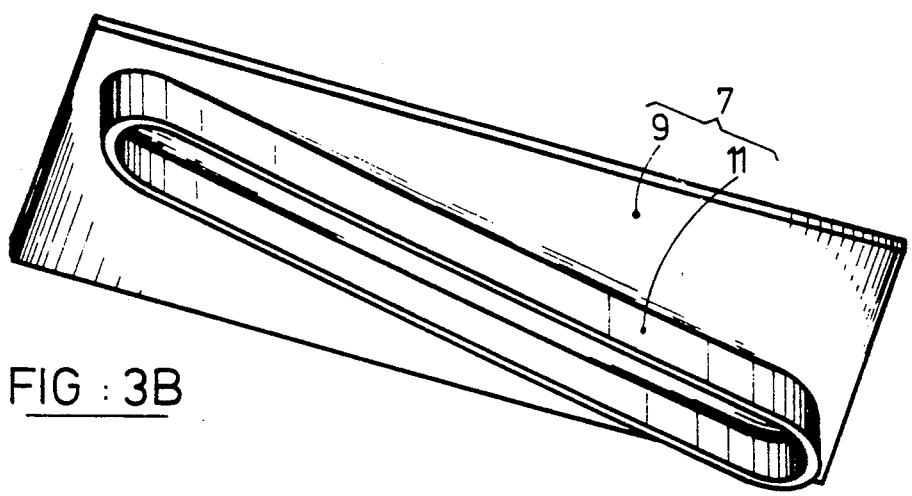
FIG : 3B
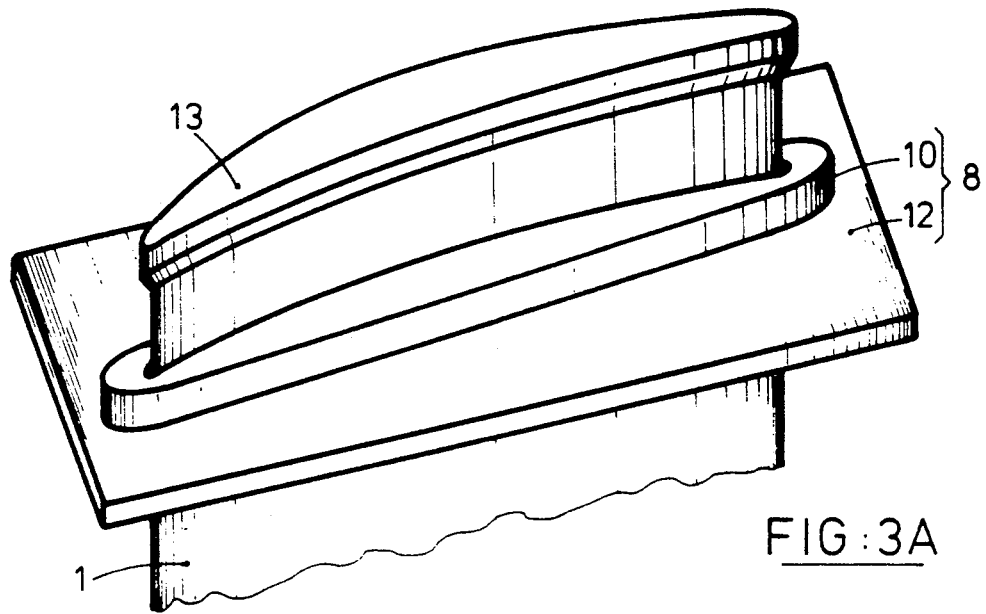
FIG : 3A
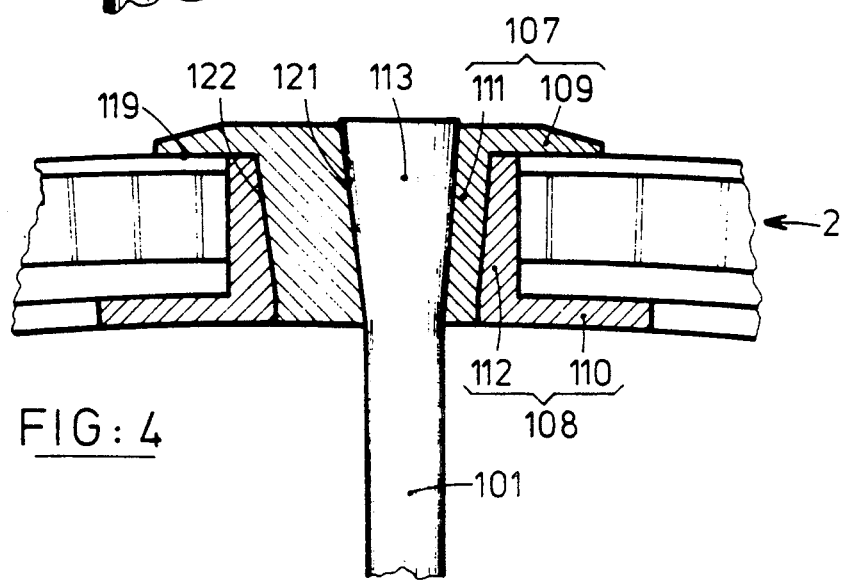
FIG : 4

TURBOMACHINE STATOR ELEMENT

BACKGROUND OF THE INVENTION

1. Field of the Invention

The present invention relates to a turbo-machine stator element comprising an array of radially disposed fixed blades mounted on a ring.

Research conducted in the field of turbo-machines, especially turbojet aero-engines for civil or military use, is leading towards the use of composite materials to make engine components, with a view, in particular, to obtaining a reduction in weight and a longer working life of the components, as well as lower costs. It is therefore considered a possibility to construct turbo-machine stators with fixed blading mounted on a ring of composite material, particularly at the outer periphery of the stator.

2. Summary of the Prior Art

Some solutions have already been proposed to resolve the problems posed by the connection between fixed blading and the corresponding stator ring. For example, FR-A-2 599 081 describes turbine stator ring blades having a bulb-shaped end embedded by packing blocks in sockets formed in an outer annular member secured to the casing. FR-A-1 021 265 describes a stator blade having a platform which is clamped between inner and outer annular members. FR-A-2 568 953 describes a fixed blade having a wedge-shaped outer end which is secured by glueing in a platform fixed in the casing which covers the end of the blade.

However, these solutions do not satisfy perfectly all the demands and conditions set by certain particular applications. In particular, they do not solve satisfactorily the problems posed by those applications in which the stator ring on which the fixed blades are to be mounted does not support compression stresses without suffering damage.

It is an object of the invention, therefore, to enable construction of a turbo-machine stator element which overcomes these problems without incurring the drawbacks of the known solutions.

SUMMARY OF THE INVENTION

According to the invention, there is provided a stator element for a turbo-machine comprising a ring and an array of radially disposed fixed blades mounted on said ring, each of said blades having a head embedded in an aperture provided in said ring by fixing means comprising first and second members termed platforms, said first platform having a plate portion and an integral socket portion fitting into said aperture, and said second platform having a plate portion and an integral socket portion housing said head of said blade, said socket portion of said second platform fitting into said socket portion of said first platform, and said plate portions of said first and second platforms sandwiching said ring between them adjacent said aperture.

Preferably, the blades, the platforms and the ring are joined together by glueing or brazing.

Other features and advantages of the invention will become apparent from the following description of two preferred embodiments of the invention with reference to the attached drawings.

BRIEF DESCRIPTION OF THE DRAWINGS

FIG. 1 shows a developed sectional view of part of a first embodiment of a turbo-machine stator element in accordance with the invention, the section being taken in a transversal plane perpendicular to the longitudinal axis of the turbo-machine.

FIG. 2 shows a diagrammatic perspective view of part of the turbo-machine stator element shown in FIG. 1.

FIG. 3A shows a perspective view of a component of the turbo-machine stator element shown in FIGS. 1 and 2.

FIG. 3B is a perspective view of another component of the stator element.

FIG. 4 shows a partial sectional view, similar to that of FIG. 1, of a second embodiment of a turbo-machine stator element in accordance with the invention.

DESCRIPTION OF THE PREFERRED EMBODIMENTS

The turbo-machine stator element shown in FIGS. 1, 2, 3A and 3B forms a flow-straightener stage of the low pressure compressor of the turbo-machine, and is made up of a series of fixed blades 1 evenly distributed peripherally and mounted radially on an outer ring 2.

In the particular applications envisaged by the invention, the ring 2 is made of a composite material. In the embodiment shown in FIG. 1, a sandwich-type material is used consisting of two skins, an inner skin 3 and an outer skin 4, glued to a core 5 of a honeycomb structure or of low density foam. The skins 3 and 4 may be thin fabric or unidirectional type skins, comprising fibres, particularly carbon-based, glass, or aramide based fibres, impregnated with an organic matrix such as an epoxy resin.

The ring 2 is provided with apertures 6 for the mounting of the blades 1, but a ring structure of the type just described cannot withstand compression stresses on the edges of the apertures 6 without suffering damage. The invention provides for the assembly of the fixed blades 1 on the ring 2 in a manner which accommodates the stresses caused by the embedding of the blades 1 in the apertures 6.

In the embodiment of the invention shown in FIGS. 1, 2, 3A and 3B, the ring 2 around each aperture 6 is sandwiched between two platforms, a radially outer platform 7 and a radially inner platform 8. The outer platform 7 comprises a plate 9 bearing on the outer skin 4 of the ring 2, and an integral socket-forming portion 11 which fits into the aperture 6. The inner platform 8 comprises a plate 10 bearing on the inner skin 3 of the ring 2, and an integral socket-forming portion 12 which fits into the socket 11 of the outer platform 7. The blade 1 which is to be fixed in the aperture 6 passes through the inner platform 8 and has a head 13 at its outer end which sets within the socket 12 of the inner platform 8. The inner platforms 8 of the stator element may be contiguous around the inside of the ring 2 as shown at 14 in FIG. 1 or, alternatively, they may be spaced apart in the same way as the outer platforms 7 as shown at 15 in FIGS. 1 and 2.

In the embodiment shown in FIGS. 1, 2 3A and 3B, the heads 13 of the fixed blades 1 are covered by the outer platforms 7. The blade heads 13 and the insides of the sockets 12 of the inner platforms 8 have cooperating tapering surfaces, 16 and 17 respectively. In addition, a rigid connection between the parts is formed. When the parts are made of composite material, this connection is usually achieved by glueing, and when the parts are of metal the connection may be effected by brazing. Connection points may be formed at 18 between the outer platforms 7 and the heads 13 of the blades 1, at 19 between the outer platforms 7 and the ring 2, at 20 between the inner platforms 8 and the ring 2, at 21 between the heads 13 of the blades 1 and the inner platforms 8, and/or at 22 between the two sockets 11 and 12 of the platforms 7 and 8 respectively. Depending upon the application, only some of these connection points may be effected.

In all cases the assembly between the heads 13 of the blades 1 and the ring 2 as described above with reference to FIGS. 1,2, 3A and 3B avoids placing in compression the edges of the apertures 6 of the ring 2. This method of fitting makes it possible to cut out apertures 6 in the ring 2 without preliminary indexing of the ring 2, and also facilitates possible replacement of a fixed blade 1 independently of the rest of the blading after operation of the stator element.

In the second embodiment of the invention shown in FIG. 4, each blade 101 has a head 113 of wedge shape received in the socket portion 111 of the outer platform 107. The socket portion 111 is correspondingly tapered in shape and fits within the socket portion 112 of the inner platform 108, the socket 112 fitting into the aperture formed in the ring 2. In this way a radial assembly is effected with the blade 101 passing through the two platforms 107 and 108.

As in the first embodiment, the ring 2 is sandwiched between the plate portions 109 and 110 of the outer and inner platforms 107 and 108 respectively. A glued joint may be formed at 119 between the outer platform 107 and the ring 2, at 122 between the two platforms 107 and 108, and at 121 between the head 113 of the blade 101 and the socket 111 of the outer platform 107.

The aerodynamic stresses exerted on the profiles of the blades 101 during operation are thus accommodated by shear of the glued joints, without exerting any compression stresses on the edges of the apertures in the ring 2.

We claim:

1. A stator element for a turbo-machine comprising a ring and an array of radially disposed fixed blades mounted on said ring, each of said blades having a head embedded in an aperture provided in said ring by fixing means comprising first and second members termed platforms, said first platform having a plate portion and an integral socket portion fitting into said aperture, and said second platform having a plate portion and an integral socket portion housing said head of said blade, said socket portion of said second platform fitting into said socket portion of said first platform, and said plate portions of said first and second platforms sandwiching said ring between them adjacent said aperture.

2. A stator element according to claim 1, wherein said ring is disposed at the radially outer ends of said blades.

3. A stator element according to claim 2, wherein said first and second platforms are respectively disposed radially outwardly and inwardly with respect to said ring, and each blade passes through the respective inner platform whereby said head of said blade is housed in said socket portion of said inner platform, said blade head and said socket portion having cooperating tapering surfaces, and the respective outer platform covering said blade head.

4. A stator element according to claim 3, wherein said inner platform is joined to said blade by glueing or brazing between said cooperating tapering surfaces of said socket portion and said blade head.

5. A stator element according to claim 3, wherein said outer platform is joined to said blade by glueing or brazing between the plate portion of said platform and said blade head.

6. A stator element according to claim 3, wherein the plate portions of the inner platforms of said blade fixing means are contiguous around the inner surface of said ring.

7. A stator element according to claim 2, wherein said first and second platforms are respectively disposed radially inwardly and outwardly with respect to said ring, and each blade passes through both said respective inner and outer platforms whereby said head of said blade is housed in said socket portion of said outer platform, said blade head and said socket portion having cooperating tapering surfaces.

8. A stator element according to claim 7, wherein said outer platform is joined to said blade by glueing or brazing between said cooperating tapering surfaces of said socket portion and said blade head.

9. A stator element according to claim 1, wherein the plate portion of said second platform is joined to the cooperating surface of said ring by glueing or brazing.

10. A stator element according to claim 1, wherein the plate portion of said first platform is joined to the cooperating surface of said ring by glueing or brazing.

11. A stator element according to claim 1, wherein said socket portions of said first and second platforms are joined together by glueing or brazing.

12. A stator element according to claim 1, wherein said ring is of sandwich type composite construction comprising a core of honeycomb or low density foam structure, and inner and outer skins glued to said core, each of said skins being formed of fibres impregnated with an organic matrix.

* * * * *